United States Patent
Oliver et al.

(10) Patent No.: US 10,250,519 B2
(45) Date of Patent: Apr. 2, 2019

(54) SYSTEM AND METHOD FOR SUPPORTING A DISTRIBUTED DATA STRUCTURE IN A DISTRIBUTED DATA GRID

(71) Applicant: Oracle International Corporation, Redwood Shores, CA (US)

(72) Inventors: Brian Keith Oliver, Acton, MA (US); Jonathan Knight, London (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 592 days.

(21) Appl. No.: 14/676,013

(22) Filed: Apr. 1, 2015

(65) Prior Publication Data
US 2015/0339331 A1  Nov. 26, 2015

Related U.S. Application Data

(60) Provisional application No. 62/001,470, filed on May 21, 2014.

(51) Int. Cl.
*G06F 9/50* (2006.01)
*G06F 9/54* (2006.01)
(Continued)

(52) U.S. Cl.
CPC ........ *H04L 47/6295* (2013.01); *G06F 9/5066* (2013.01); *G06F 9/54* (2013.01);
(Continued)

(58) Field of Classification Search
CPC .......... G06F 17/30592; G06F 11/3495; G06F 17/30333; G06F 17/30463;
(Continued)

(56) References Cited

U.S. PATENT DOCUMENTS 6,259,988 B1 * 7/2001 Galkowski ............. G01C 21/00
340/989
7,895,431 B2 * 2/2011 Bouchard ............... H04L 12/56
370/395.4

(Continued)

FOREIGN PATENT DOCUMENTS

WO    2010117294    10/2010

OTHER PUBLICATIONS

European Patent Office, International Searching Authority, International Search Report and Written Opinion dated Oct. 1, 2015 for International Application No. PCT/US2015/028335, 12 pages.

(Continued)

*Primary Examiner* — Angelica Ruiz
(74) *Attorney, Agent, or Firm* — Tucker Ellis LLP

(57) ABSTRACT

A system and method can support a distributed data structure in a distributed data grid. The distributed data grid includes a plurality of buckets, wherein each said bucket is configured with a capacity to contain a number of elements in the distributed data structure. Furthermore, the distributed data grid includes a state owner process, which is configured to hold state information for the distributed data structure and provides the state information for the distributed data structure to a client process.

19 Claims, 14 Drawing Sheets

(51) Int. Cl.
  *G06F 17/30*     (2006.01)
  *H04L 29/08*     (2006.01)
  *H04L 12/863*    (2013.01)
  *G06F 16/21*     (2019.01)
  *G06F 16/25*     (2019.01)

(52) U.S. Cl.
  CPC ............ *G06F 16/219* (2019.01); *G06F 16/25* (2019.01); *H04L 47/6205* (2013.01); *H04L 67/10* (2013.01)

(58) Field of Classification Search
  CPC ......... G06F 17/30569; G06F 17/30607; G06F 2201/875; G06F 3/048
  See application file for complete search history.

(56) References Cited

U.S. PATENT DOCUMENTS

| | | | |
|---|---|---|---|
| 8,417,708 B2* | 4/2013 | Chidlovskii | G06F 17/30241 707/743 |
| 9,632,723 B1 | 4/2017 | Gupta | |
| 2002/0120717 A1 | 8/2002 | Giotta | |
| 2007/0113031 A1 | 5/2007 | Brown | |
| 2007/0136311 A1 | 6/2007 | Kasten | |
| 2008/0120129 A1* | 5/2008 | Seubert | G06Q 10/06 705/35 |
| 2010/0205181 A1* | 8/2010 | Chidlovskii | G06F 17/30241 707/741 |
| 2010/0325190 A1 | 12/2010 | Riley | |
| 2013/0074083 A1 | 3/2013 | Oliver et al. | |
| 2013/0198759 A1 | 8/2013 | Shah | |
| 2014/0040212 A1* | 2/2014 | Yochai | G06F 3/0635 707/687 |
| 2015/0264152 A1 | 9/2015 | Vlachogiannis | |

OTHER PUBLICATIONS

Peter Robert Pietzuch, "Hermes: A scalable event-based middleware", Technical Report No. 590-UCAM-CL-TR-590, Jun. 1, 2004, pp. 1-180; © 2004 Peter R. Pietzuch, retrieved Oct. 20, 2015 from: <http://www.doc.ic.ac.uk/~prp/manager/doc/thesis/prp thesis.pdf>.

* cited by examiner

SYSTEM AND METHOD FOR SUPPORTING A DISTRIBUTED DATA STRUCTURE IN A DISTRIBUTED DATA GRID

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims priority on U.S. Provisional Patent Application No. 62/001,470, filed May 21, 2014 entitled "SYSTEM AND METHOD FOR SUPPORTING A DISTRIBUTED DATA STRUCTURE", which application is herein incorporated by reference in its entirety.

CROSS REFERENCE TO RELATED APPLICATIONS

This application is related to the following patent applications, each of which is hereby incorporated by reference in its entirety:

U.S. patent application Ser. No. 14/676,030, filed Apr. 1, 2015, entitled "SYSTEM AND METHOD FOR PROVIDING A DISTRIBUTED QUEUE IN A DISTRIBUTED DATA GRID".

FIELD OF INVENTION

The present invention is generally related to computer systems, and is particularly related to supporting a distributed data grid.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which may have a limited capacity to accommodate that demand. This is the general area that embodiments of the invention are intended to address.

SUMMARY

Described herein are systems and methods which support a distributed data structure in a distributed data grid. The distributed data grid includes a plurality of buckets, wherein each said bucket is configured with a capacity to contain a number of elements of a distributed data structure. Furthermore, the distributed data grid includes a state owner process, which is configured to hold state information for the distributed data structure and provides the state information for the distributed data structure to a client process.

DETAILED DESCRIPTION

Figure 1:
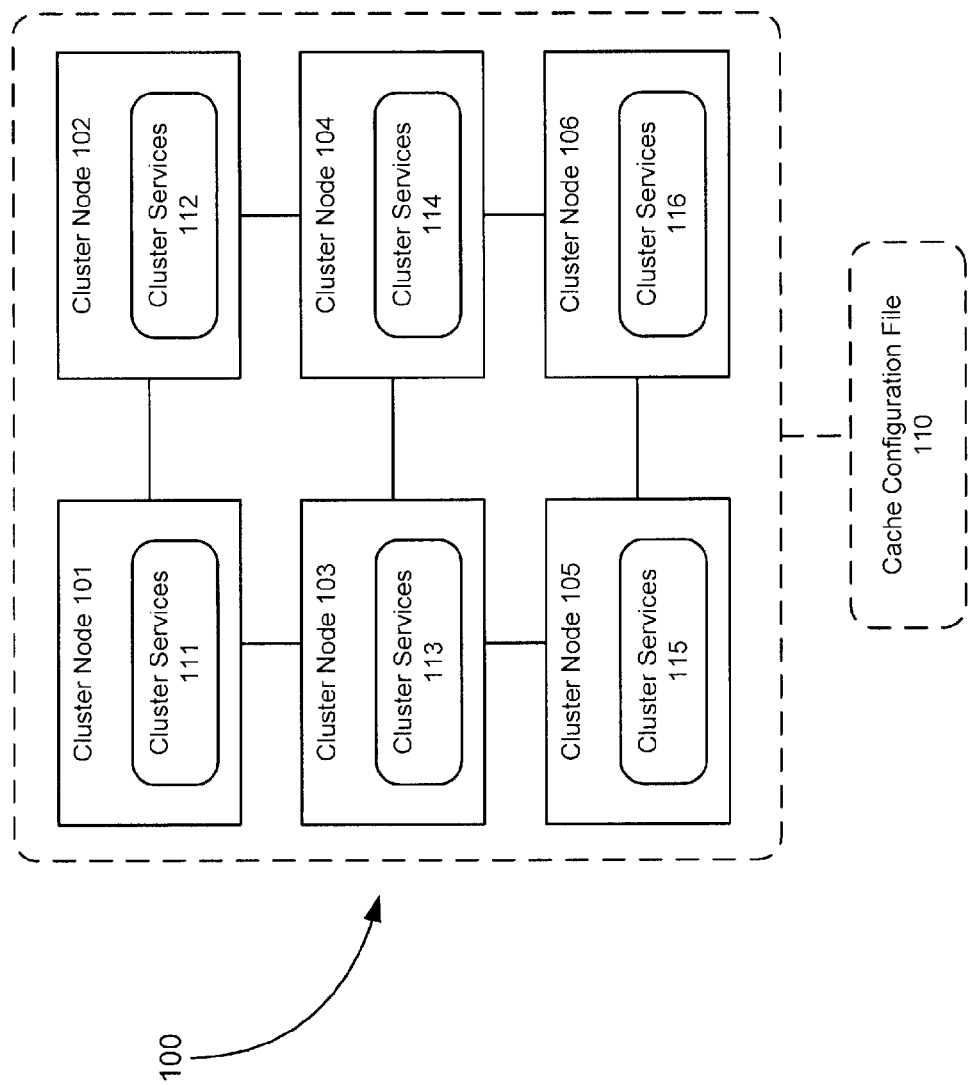
FIG. 1 is an illustration of a data grid cluster in accordance with various embodiments of the invention.

Described herein are systems and methods that can support a distributed data structure in a distributed data grid. The distributed data grid includes a plurality of buckets, wherein each bucket is configured with a capacity to contain a number of elements of a distributed data structure. Furthermore, the distributed data grid includes a state owner process, which is configured to hold state information for the distributed data structure and provides the state information for the distributed data structure to a client process.

Distributed Data Grid

In accordance with an embodiment, as referred to herein a "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

FIG. 1 is an illustration of a data grid cluster in accordance with various embodiments of the invention. As shown in FIG. 1, a data grid cluster 100, e.g. an Oracle Coherence data grid, includes a plurality of cluster members (or server nodes) such as cluster nodes 101-106, having various cluster services 111-116 running thereon. Additionally, a cache configuration file 110 can be used to configure the data grid cluster 100. In an embodiment, the data grid cluster 100 is an in-memory data grid cluster which provides the data storage and management capabilities by distributing data in the memory of cluster nodes working together.

Distributed Data Structure

In accordance with an embodiment of the invention, a distributed data grid can support a distributed data structure. For example, the distributed data structure can be a distributed queue, a distributed set, a distributed list, and/or a distributed stack.

Figure 2:
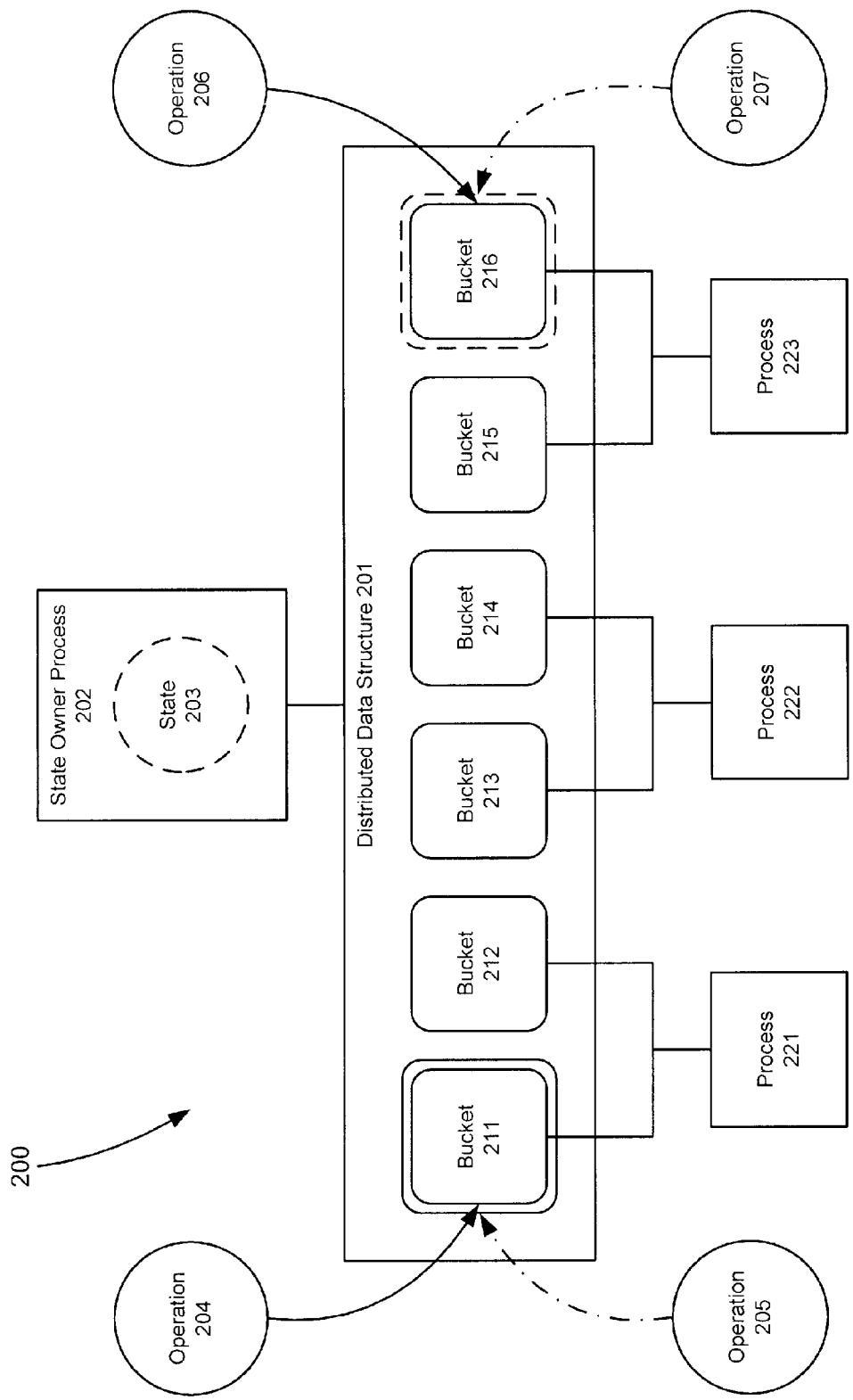
FIG. 2 shows an illustration of supporting a distributed data structure in a distributed data grid, in accordance with an embodiment of the invention.

FIG. 2 shows an illustration of supporting a distributed data structure in a distributed data grid, in accordance with an embodiment of the invention. As shown in FIG. 2, a distributed data structure 201 can include a plurality of buckets (e.g. buckets 211-216), each of which is configured to contain a number of elements. In use the buckets may contain zero, one, or more elements at different times. The elements can be data elements comprising, for example, units of data, calls, requests, responses, messages, transactions, and/or events, depending upon the application of the distributed data structure.

Furthermore, a state owner process 202 in the cluster 200 can be responsible for holding the state 203 for the distributed data structure 201. The distributed data structure 201 can perform different operations on the different buckets 211-216 separately, instead of working on the individual elements directly.

As shown in FIG. 2, a cluster of processes, such as the processes 221-223 in a distributed data grid 200, can maintain (or own) the plurality of buckets 211-216. For example, the buckets 211-216 can be evenly distributed across the cluster of processes 221-223, with each process being responsible for maintaining (or owning) one or more buckets. Thus, the total size of the distributed data structure 201 can exceed the maximum storage capacity of a single process, since each process 221-223 is responsible for storing only a part of the contents of the distributed data structure 201.

In accordance with an embodiment of the invention, the distributed data structure 201 allows multiple user processes to simultaneously perform different operations on the different buckets 211-216 in the distributed data structure 201. As shown in FIG. 2, an operation 204 can be performed on the bucket 211, while another operation 206 is performed on the bucket 216. Thus, the system can reduce contention on the distributed data structure 201, since the demand for accessing the distributed data structure 201 can be spread over multiple buckets.

Furthermore, the distributed data structure 201 can ensure that only one process is able to access the elements in a single bucket at any time. For example, the system can apply a lock mechanism on each individual bucket that is under contention. Alternatively, the system can take advantage of a request queue, which allows the different processes to wait for processing in order.

As shown in FIG. 2, the bucket 211 is locked, while an operation 204 is being performed on a bucket 211. Other operations on the same bucket 211, such as the operation 205, may need to wait until the locking operation 204 is completed. Similarly, the bucket 216 is locked while an operation 206 is being performed on a bucket 216, and other operations on the same bucket 216, such as the operation 207, may need to wait until the locking operation 206 is completed.

Figure 3:
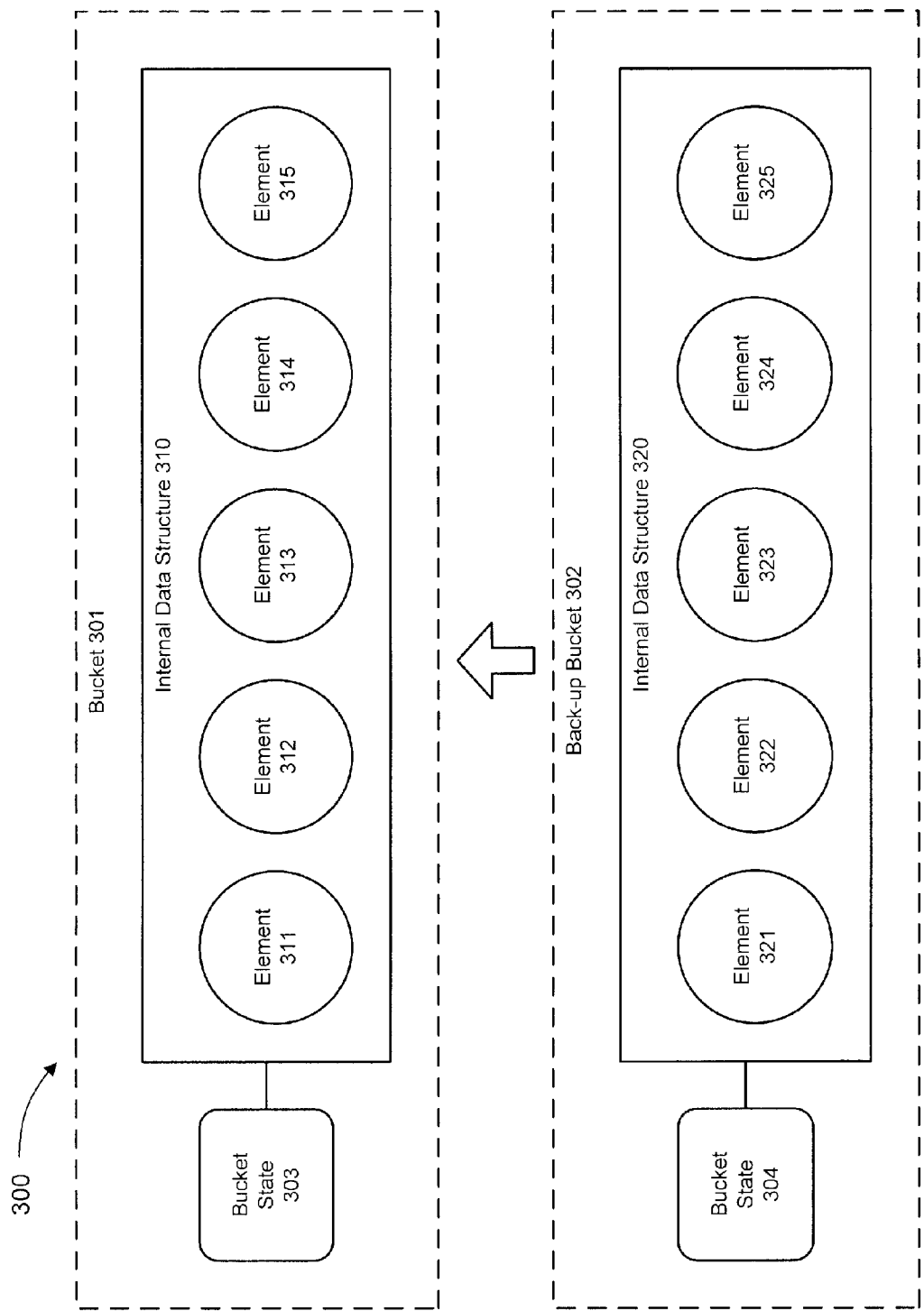
FIG. 3 shows an illustration of supporting a bucket in a distributed data structure, in accordance with an embodiment of the invention.

FIG. 3 shows an illustration of supporting a bucket in a distributed data structure, in accordance with an embodiment of the invention. As shown in FIG. 3, a bucket 301 in the distributed data grid 300 is configured to contain a number of elements and may contain one or more elements, e.g. elements 311-315 in an internal data structure 310, for a distributed data structure. Additionally, the bucket 301 can maintain various bucket states 303, which can be used for accessing the elements 311-315 stored in the bucket 301.

In accordance with an embodiment of the invention, the bucket 301 is configured with a capacity, which is the maximum number of elements that it can contain. The bucket 301 is thus configured to contain a number of elements of a distributed data structure. The bucket 301 can hold zero to more elements (up to the capacity) while in use. Furthermore, the capacity of the bucket 301 can be tuned for supporting different distributed data structures (in order to improve the performance for specific data access patterns).

Additionally, the bucket 301 can be replicated to other nodes in the distributed data grid 300. As shown in FIG. 3, a back-up bucket 302, which contains one or more elements (e.g. elements 321-325 in an internal data structure 320) and the associated bucket state 304, can take over when the bucket 301 is lost.

Figure 4:
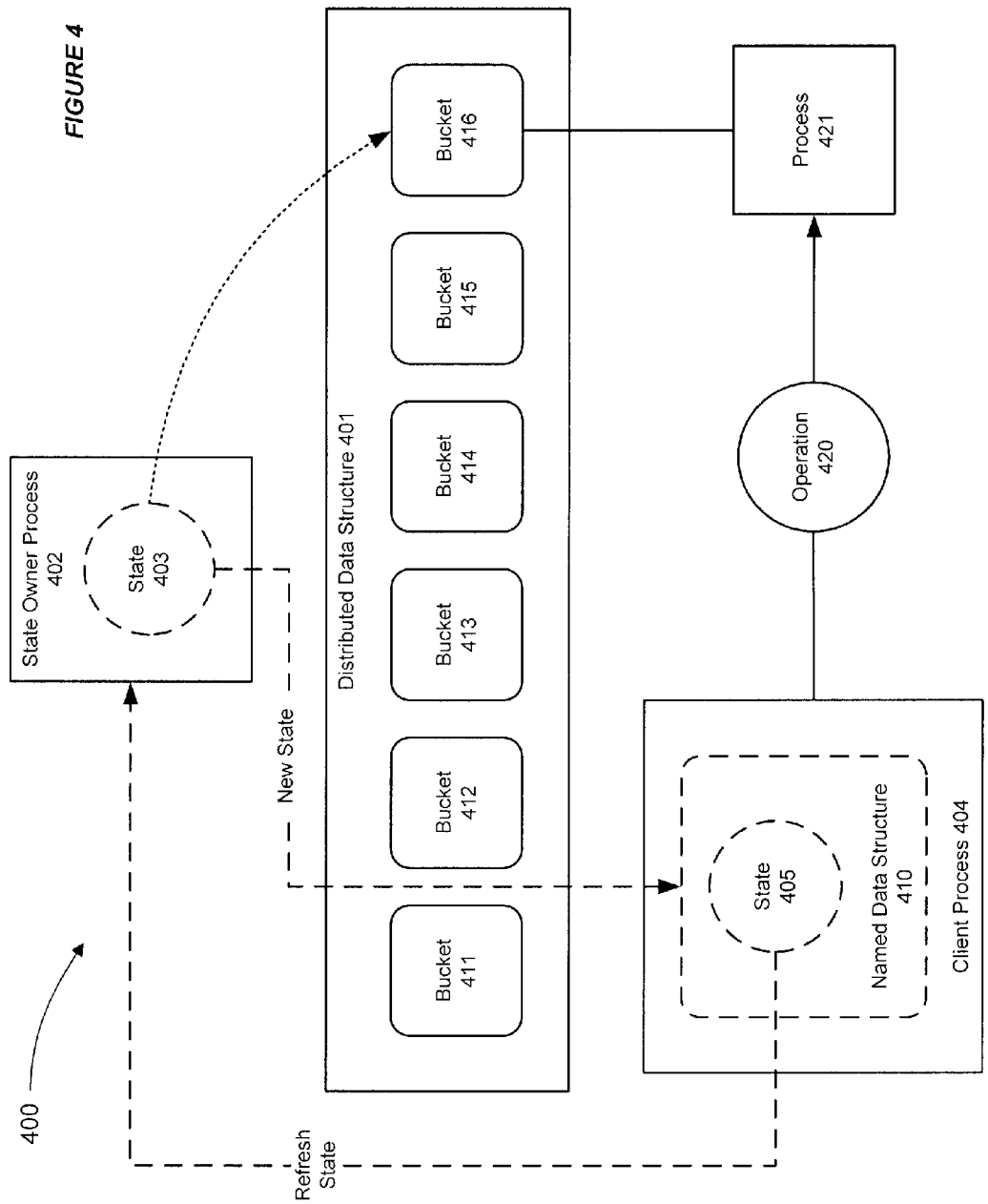
FIG. 4 shows an illustration of performing an operation on a distributed data structure using a client process, in accordance with an embodiment of the invention.

FIG. 4 shows an illustration of performing an operation on a distributed data structure using a client process, in accordance with an embodiment of the invention. As shown in FIG. 4, a distributed data structure 401 in a distributed data grid 400 can include a plurality of buckets, e.g. buckets 411-416. Additionally, a state owner process 402 can be responsible for holding the state information 403 for the distributed data structure 401.

Furthermore, a client process 404 can use (or include) a named data structure 410, which holds a local copy of the state information 405 for the distributed data structure 401. For example, the system can initialize the state information 405, when the client process 404 first connects to the distributed data structure 401.

In accordance with an embodiment of the invention, multiple client processes can access the distributed data structure 401 simultaneously. The local copy of the state information 405 on the client process 404 may become stale when another client process has changed the state 403 of the distributed data structure 401.

Using distributed data structure 401, the logic in the named data structure 410 (i.e. used by the client process 404) can take into account that the state 405 may be stale. Thus, there is no need for refreshing the state information 405 before every operation.

As shown in FIG. 4, when the state 405 becomes stale, the named data structure 410 (on the client process 404) can send a message to the state owner process 402 for refreshing the state 405. After receiving the message, the state owner process 402 can send the new state 403 back to the client process 404, which in turn can perform the operation 420 on the bucket 416 via the process 421.

In accordance with an embodiment of the invention, once a bucket is created, the bucket may not be removed from the distributed data structure 401, even when the bucket becomes empty (i.e. when all of the elements have been polled or removed from the bucket). This can be beneficial for supporting the operation of multiple client processes.

Figure 5:
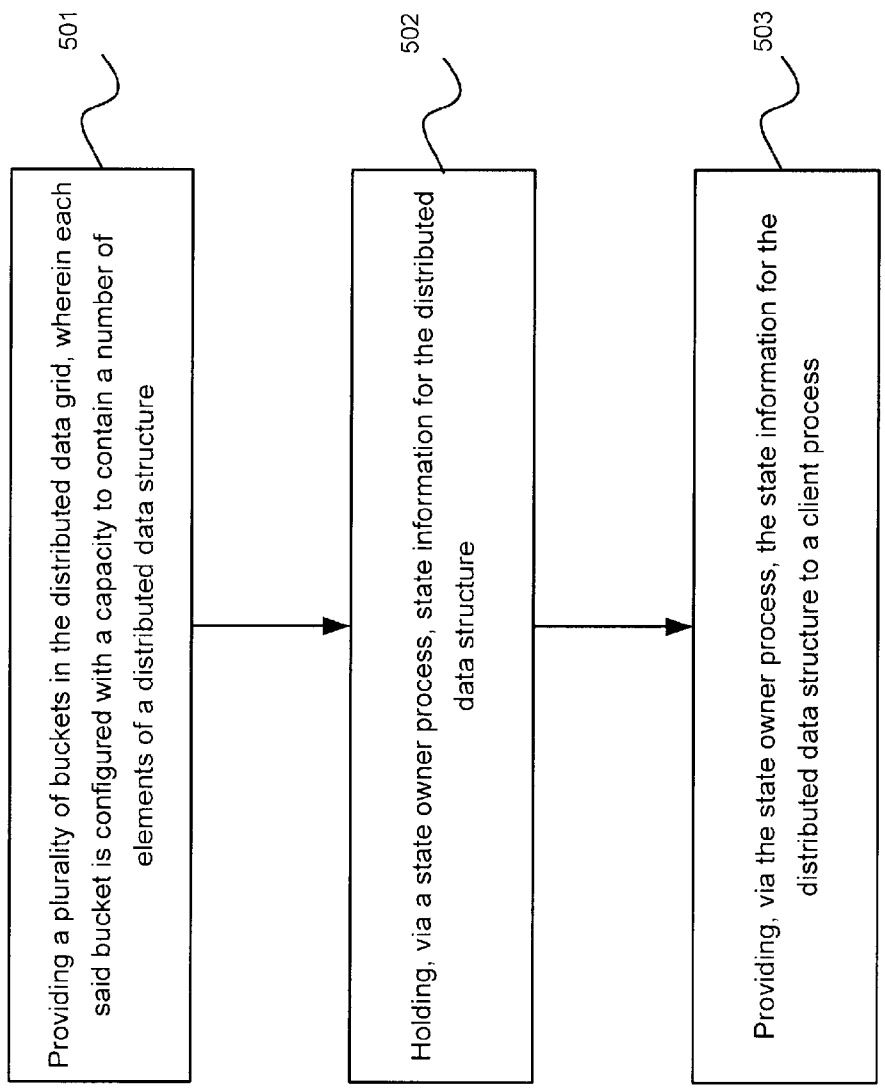
FIG. 5 illustrates an exemplary flow chart for supporting a distributed data structure in a distributed data grid, in accordance with an embodiment of the invention.

FIG. 5 illustrates an exemplary flow chart for supporting a distributed data structure in a distributed data grid, in accordance with an embodiment of the invention. As shown in FIG. 5, at step 501, the system can provide a plurality of buckets in the distributed data grid, wherein each said bucket is configured with a capacity to contain a number of elements of a distributed data structure. The buckets may contain zero or more elements (up to the capacity) of a distributed data structure at different points during use. Furthermore, at step 502, a state owner process can hold state information for the distributed data structure. Then, at step 503, the state owner process can provide the state information for the distributed data structure to a client process.

Distributed Queue

In accordance with an embodiment of the invention, a distributed data grid can support a distributed queue. For example, the distributed queue is a queue of queues (or buckets) with each bucket being a sub-queue in a parent queue.

Figure 6:
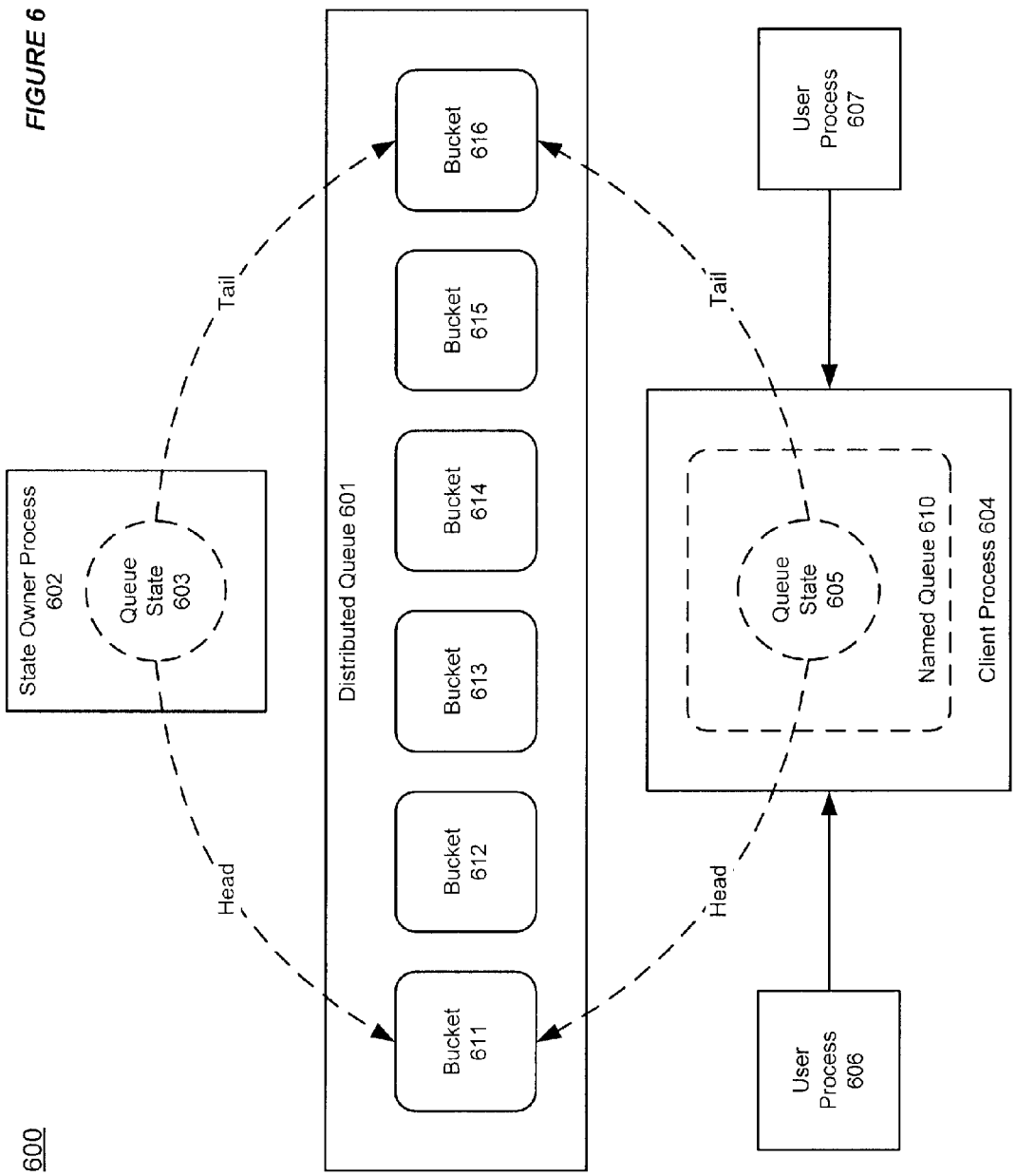
FIG. 6 shows an illustration of supporting a distributed queue in a distributed data grid, in accordance with an embodiment of the invention.

FIG. 6 shows an illustration of supporting a distributed queue in a distributed data grid, in accordance with an embodiment of the invention. As shown in FIG. 6, a distributed queue 601 can include a queue of buckets, e.g. buckets 611-616, in a distributed data grid 600. Each of the plurality of buckets (e.g. buckets 611-616) is configured to contain a number of elements. In use the buckets may contain zero, one, or more elements at different times. The elements can be data elements comprising, for example, units of data, calls, requests, responses, messages, transactions, and/or events, depending upon the application of the distributed data structure.

Additionally, a state owner process 602 can be responsible for holding the state 603 for the distributed queue 601. For example, the state 603 can include a head pointer to the current head bucket 611 in the distributed queue 601 and a tail pointer to the tail bucket 616 in the distributed queue 601.

In accordance with an embodiment of the invention, a client process 604 can obtain the current state 603 of the distributed queue 601 from the queue state owner 602, and perform various operations (such as the offer and poll operations) on the distributed queue 601.

As shown in FIG. 6, the client process 604, which can be accessed by the user processes 606-607, can use (or include) a named queue 610. The named queue 610 can maintain a local copy of the queue state 605, which includes a head pointer and a tail pointer in its own view. For example, the head pointer in the queue state 605 may point to the head bucket 611 and the tail pointer in the queue state 605 may point to the tail bucket 616.

The queue state 605 structure can be initialized when the client process 604 first connects to the distributed queue 601. Furthermore, the client process 604 does not need to refresh its queue state 605 before every operation, since the logic in named queue 610 (for performing the offer and poll operations) can take into account that the queue state 605 maintained may be stale.

In accordance with an embodiment of the invention, the client process 604 can perform an offer operation on the distributed queue 601, by offering (or adding) one or more elements to the tail bucket 616 (i.e. the end) of the distributed queue 601. Also, the client process 604 can perform a poll operation on the distributed queue 601, by polling (or removing) one or more elements from the head bucket 611 (i.e. the front) of the distributed queue 601. Additionally, the client process 604 can perform a peek operation on the distributed queue 601 to obtain the value of one or more elements (without removing the elements from the distributed queue 601).

Additionally, different client processes may attempt to perform different operations simultaneously. Implicit transactions may be formed around the head bucket 611 and the tail bucket 616 of the distributed queue 601 for handling the multiple attempts by different client processes. The system can apply a lock mechanism on the head bucket 611 and/or the tail bucket 616, which are under contention. Alternatively, the system can take advantage of a request queue, which allows the different processes to wait for processing in order.

Figure 7:
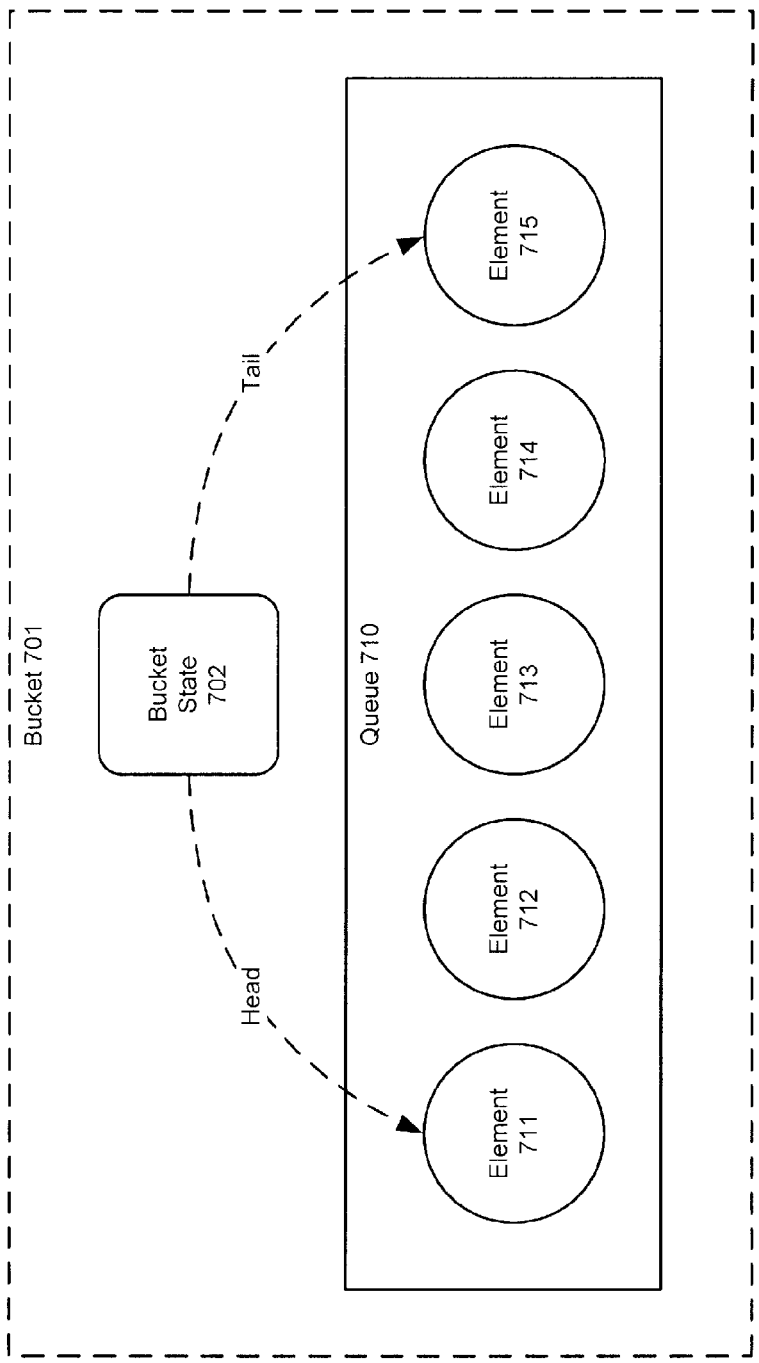
FIG. 7 shows an illustration of a bucket in a distributed queue, in accordance with an embodiment of the invention.

FIG. 7 shows an illustration of a bucket in a distributed queue, in accordance with an embodiment of the invention. As shown in FIG. 7, a bucket 701 in a distributed queue 700 contains a queue of elements, e.g. elements 711-715 in a queue 710.

Additionally, the bucket 701 can maintain various bucket states 702, which can be used for accessing the different elements 711-715 stored in the bucket 701. The bucket states 702 can include a pointer to a head element 711 in the bucket 701 and a pointer to a tail element 716 in the bucket 701.

Furthermore, the elements 711-715 in the bucket 701 can be stored using the same process (which stores the bucket 701). When the bucket 701 is first created, the pointers to the head and tail elements can contain a special value indicating that the bucket 701 is empty. Also, the bucket 701 can contain a flag to indicate whether the bucket 701 is the last bucket in the queue.

Figure 8:
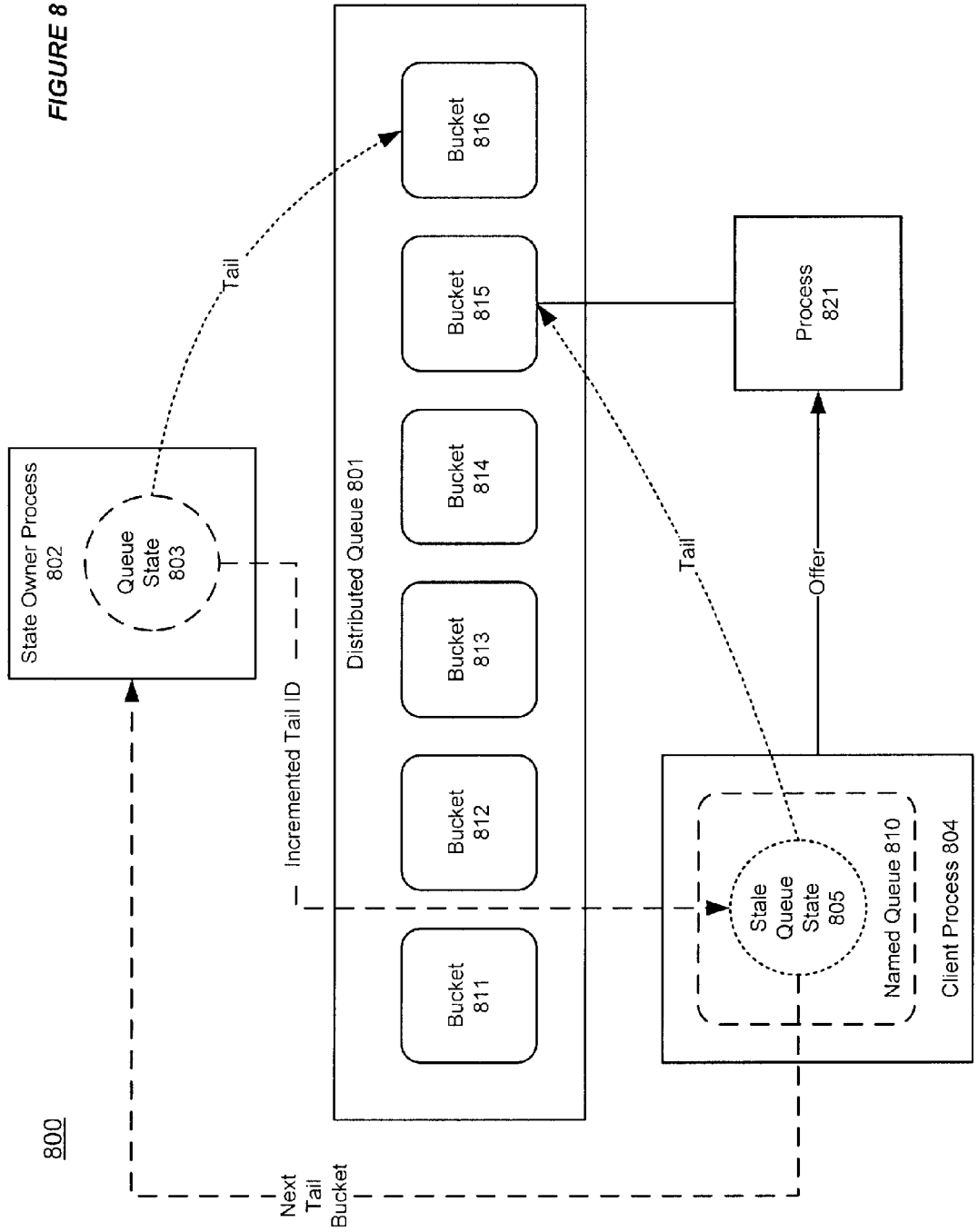
FIG. 8 shows an illustration of offering an element to a distributed queue, in accordance with an embodiment of the invention.

FIG. 8 shows an illustration of offering an element to a distributed queue, in accordance with an embodiment of the invention. As shown in FIG. 8, a distributed queue 801 in a distributed data grid 800 can include a queue of buckets, e.g. buckets 811-816, each of which may be configured with a capacity to hold a number of elements and may hold zero or more elements during use. Additionally, a state owner process 802 can be responsible for holding the queue state 803 information for the distributed queue 801.

In accordance with an embodiment of the invention, a client process 804 may attempt to offer (or add) one or more elements to the tail bucket as indicated by the queue state 805 in the named queue 810. For example, the client process 804 may assume the bucket 815 to be the tail bucket, since the tail pointer in the queue state 805 points to the bucket 815. Accordingly, the client process 804 can send an offer message (containing a set of elements) to the process 821, which maintains the bucket 815.

Then, the client process 804 can receive a response to its message. The contents of the response can signify to the client process 804 whether the offer operation was successful. For example, if the response is empty then all of the offered elements were added to the tail bucket. On the other hand, if the response contains any elements, then these elements were not offered (or added) to the bucket.

There can be different reasons that the system fails to offer (or add) one or more elements to the bucket. For example, the perceived tail bucket may no longer be current (i.e. the queue state 805 is stale), in which case all of the elements are returned in the response. Alternatively, the current tail bucket may not have enough remaining capacity for holding all of the offered elements, in which case the remaining elements are returned in the response message.

In either case, when the response to an offer contains un-offered elements, the client process 804 may need to know what the next tail bucket ID is. The process 804 can send a message to the state owner process 802, which owns the queue state 803, to inform the state owner process 802 that the queue state 803 should point to the next tail bucket.

When there are multiple client processes, the client process 804 may not know whether another client process has already moved the tail ID. The system can perform the operation to move the tail ID as an atomic compare and set operation.

As shown in FIG. 8, when the client process 804 asks the queue state owner process 802 to increment the tail ID, the client process 804 can also send the tail ID in the queue state 805 to the queue state owner process 802.

When the tail ID in the queue state 805 matches the current tail ID in the queue state 803, the system can change the queue state 803 by moving the tail to the next bucket ID. Then, the system can send the tail ID in the updated queue state 803 to the client process 804 as a response.

When the tail ID in the queue state 805 does not match the current tail ID in the queue state 803, the queue state 803 may have either been incremented by this message, or had previously been incremented. Then, the system can send the tail ID in the current queue state 803 to the client process 804 as a response.

For example, if the tail ID on the client side is 10 and the tail ID on the owner side is 10, then the tail ID on the owner side can be moved to 11, which value may be returned to the client. If the tail ID on the client side is 10 and the tail ID on the owner side is already 11, then the queue state owner may return the value 11 to the client.

As shown in FIG. 8, the queue state 803 points to the new tail bucket 816. After the client process 804 receives the correct tail ID, the client process 804 can send an offer message, containing any remaining elements to be offered, to the process that owns the new tail bucket 816.

Furthermore, the new tail bucket 816 may not be able to hold all of the offered elements. For example, another client process may have already filled the new tail bucket 816, or the new tail bucket 816 does not have sufficient capacity to hold all of the elements. Then, the system can repeat the above process of incrementing the tail bucket ID and offering the remaining elements, until all of the elements have been successfully offered (or added) to the distributed queue 801.

Figure 9:
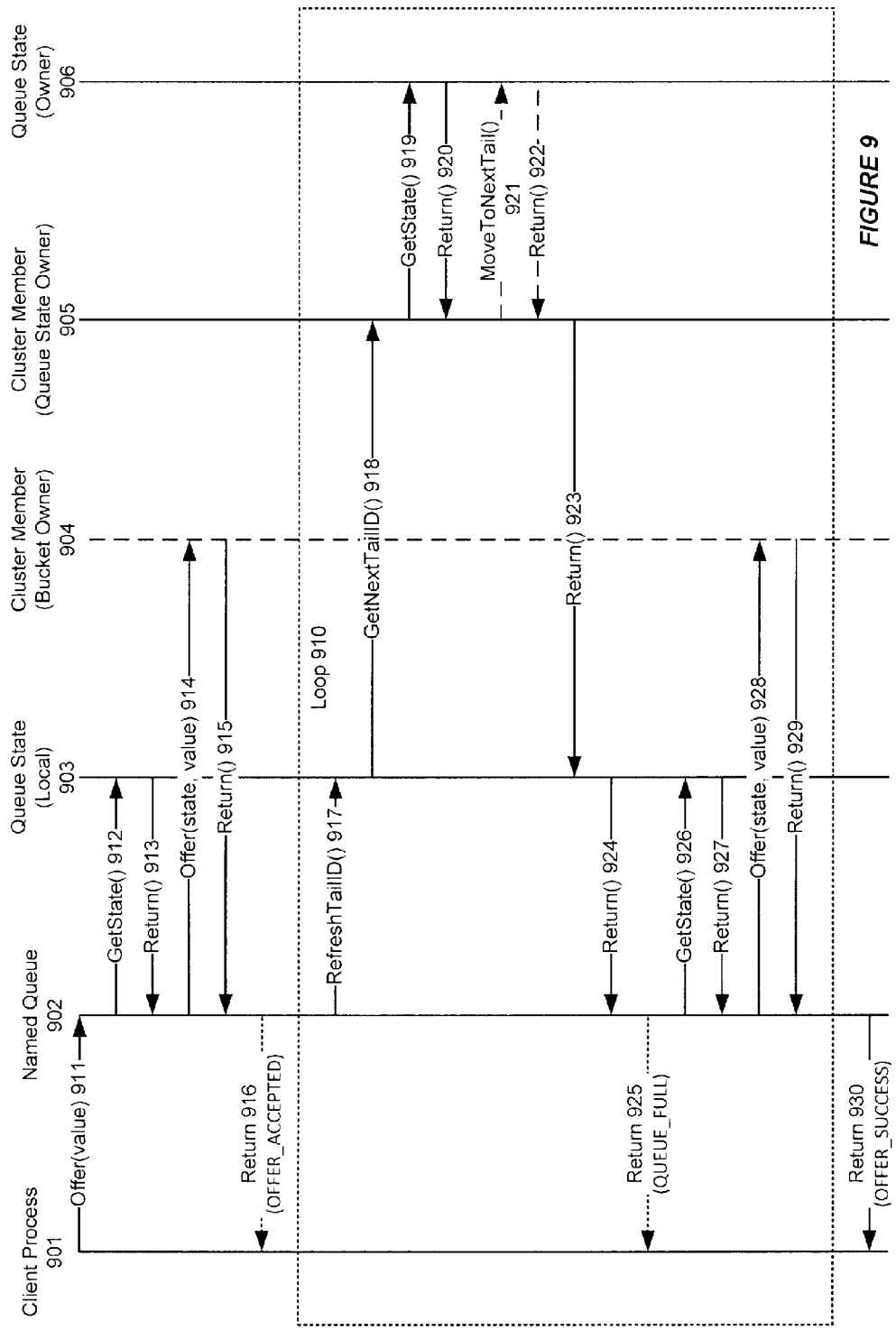
FIG. 9 shows an illustration of an interaction diagram for offering an element to a distributed queue, in accordance with an embodiment of the invention.

FIG. 9 shows an illustration of an interaction diagram for offering an element to a distributed queue, in accordance with an embodiment of the invention. As shown in FIG. 9, a client process 901 can use a named queue 902 for offering (or adding) one or more elements to a distributed queue in a distributed data grid. The distributed data grid includes a cluster member 905, which is the queue state owner 905 that owns the queue state 906.

At step 911, a named queue 902 can receive a message (e.g. from a client process 901) to offer a new value to the tail of the distributed queue. The named queue 902, which is associated with the client process 901, can maintain a queue state 903, which is a local version of the queue state 906 for the distributed queue.

The named queue 902 may assume that the information in the local queue state 903 is correct. At steps 912-913, the named queue 902 can request and receive the state information, such as the tail ID and the queue version number, from the local queue state 903.

Then, the named queue 902, which is associated with the client process 901, can send an offer message to the cluster member, which owns the tail bucket, accordingly to its local view. At step 914, the named queue 902 can offer the received value to the cluster member 904, which owns the tail bucket based on the tail ID received from the queue state 906.

If the value is offered (or added) successfully to the tail bucket, at step 915, the cluster member 904 can return an empty set, and at step 916, the named queue 902 can return an OFFER_ACCEPTED message to the client process 901.

Otherwise, the value is not successfully offered (or added) to the tail bucket, e.g. due to either the bucket being full or a mismatch in the queue state version. At step 915, the cluster member 904 can return a set of un-offered elements back to the named queue 902. Then the named queue 902 may attempt the offer operation again, e.g. by sending a message to the next tail bucket. The named queue 902 may try to add the received to the tail of the distributed queue repeatedly (e.g. in a loop 910), until either when the distributed queue is full or the received value is successfully offered (or added).

Within the loop 910, the named queue 902 may need to refresh or update its view of the tail ID and the queue version, if a previous offer fails due to a full bucket or a version mismatch.

At step 917, the named queue 902 can send a request to the local queue state 903 to refresh the tail ID. At step 918, the local queue state 903 may try to obtain the next tail ID from the cluster member 905, which is the owner of the queue state 906. For example, the message may contain the tail ID and queue version information based on such information in the local queue state 903.

At steps 919-920, the cluster member 905 can request and obtain the state information in the owner version of the queue state 906. Thus, the cluster member 905 can determine whether the queue state should be refreshed, e.g. by comparing the information received from the local queue state 903 and queue state 906.

For example, the queue state 903 is stale when the information in the local queue state 903 does not match the information in the owner queue state 906. In such a case, the state information in the owner queue state 906 may be returned to the local queue state 903 (i.e. the local queue state 903 is refreshed).

When the information in the local queue state 903 matches the information in the queue state 906, at step 921, the cluster member 905 can update the queue state 906, e.g. by moving the tail to the next bucket ID. Then, at step 922, the queue state 906 can provide the updated queue state information to the cluster member 905. For example, the queue version number may be incremented, if the tail ID moves to the next Bucket ID by wrapping back around to the first bucket ID or any other reused buckets.

Additionally, a check can be performed to determine whether the queue is full. For example, a queue is full if incrementing the tail ID would make the tail ID equivalent to the current head ID.

As shown in FIG. 9, at steps 923-924, the cluster member 905 can provide the queue state information (refreshed or updated) to the queue state 903, which in turn can provide the queue state information to the named queue 902. For example, such state information may include either a QUEUE_FULL message or an updated tail ID with an updated queue version number.

At step 925, when the distributed queue is full, the named queue 902 can send a QUEUE_FULL message to the client process 901. Otherwise, at steps 926-927, the named queue 902 can request and obtain the queue state information from the queue state 903. Furthermore, at steps 928-929, the named queue 902 can offer (or add) the value to the cluster member 904 (or any other cluster member that owns the bucket with the updated tail ID).

As shown in FIG. 9, the named queue 902 may try to offer (or add) the received element to the tail of the distributed queue repeatedly, e.g. in the loop 910, until the received value is successfully added. At step 930, the named queue 902 can send a QUEUE_SUCCESS message to the client process 901 after the received value is successfully added.

Figure 10:
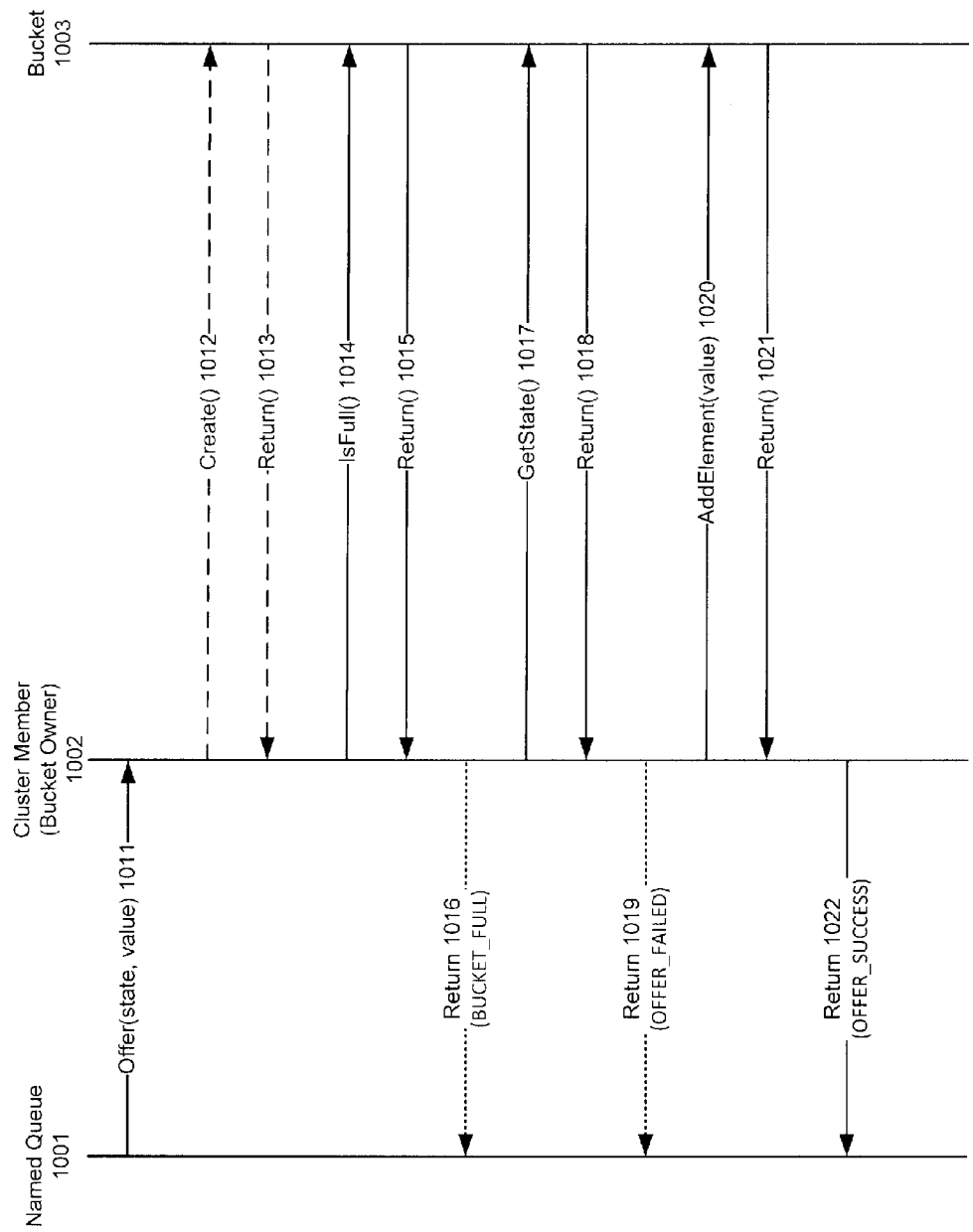
FIG. 10 shows an illustration of an interaction diagram for offering an element to a bucket in a distributed queue, in accordance with an embodiment of the invention.

FIG. 10 shows an illustration of an interaction diagram for offering an element to a bucket in a distributed queue, in accordance with an embodiment of the invention. As shown in FIG. 10, a caller (e.g. a named queue 1001) can be used for offering (or adding) one or more elements to a particular bucket 1003, which is owned by a cluster member 1002 in a distributed data grid.

At step 1011, the named queue 1001 can offer a value to the cluster member 1002 based on the state information, such as the bucket ID and the queue version information. At steps 1012-1013, a new bucket may be created if the bucket 1003 with the specific bucket ID does not exist.

At steps 1014-1015, the cluster member 1002 can check whether the bucket 1003 is full. When the bucket is full, at step 1016, the cluster member 1002 can send a BUCKET_FULL message to the named queue 1001. Otherwise, at steps 1017-1018, the cluster member 1002 can obtain the bucket state information from the bucket 1003.

At step 1019, if the queue version information in the view of the named queue 1001 does not match the queue version information associated with the bucket 1003, the named queue 1001 can send an OFFER_FAILED message to the named queue 1001.

At steps 1020-1021, the named queue 1001 can add the value into the bucket 1003. Then, at step 1022, the named queue 1001 can send an OFFER_SUCCESS message to the named queue 1001.

Figure 11:
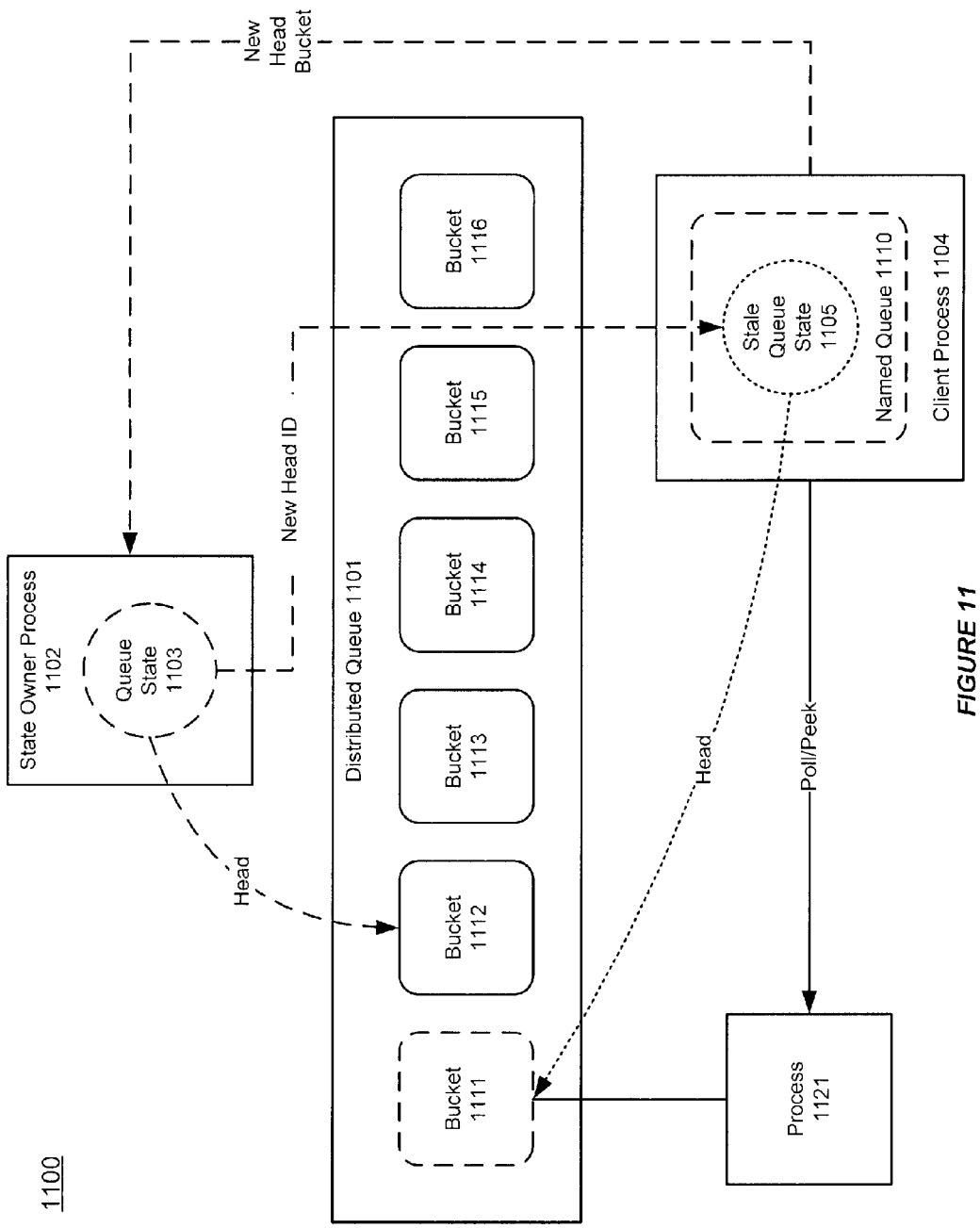
FIG. 11 shows an illustration of polling an element from a distributed queue, in accordance with an embodiment of the invention.

FIG. 11 shows an illustration of polling an element from a distributed queue, in accordance with an embodiment of the invention. As shown in FIG. 11, a distributed queue 1101 in a distributed data grid 1100 can include a queue of buckets, e.g. buckets 1111-1116, each of which may include one or more elements. Additionally, a state owner process 1102 can be responsible for holding the queue state 1103 information for the distributed queue 1101.

In accordance with an embodiment of the invention, a client process 1104 can perform a poll or peek action on the head bucket of the distributed queue 1101. For example, a poll action may return and remove an element (such as the head element) from the distributed queue 1101. On the other hand, a peek action may return the value of the head element of the distributed queue 1101 without removing the head element.

As shown in FIG. 11, the client process 1104 assumes the bucket 1111 to be the head bucket in the distributed queue 1101. In order to poll from the distributed queue 1101, the client process 1104 sends a message to the process 1121, which owns the head bucket 1111. Then, the client process 1104 can receive a response containing either the element from the head of the distributed queue 1101 or an indicator that the bucket 1111 is empty.

If the response indicates that the bucket 1111 is empty (providing that the distributed queue 1101 itself is not empty), then the queue state 1105, which is maintained by the named queue 1110, is stale. Thus, the queue state 1105 may need to be refresh the head bucket ID to the next head ID.

As shown in FIG. 11, the queue state 1104 can send a message to the state owner process 1102, which owns the queue state 1103, to instruct the queue state 1103 to increment the head ID. The operation of moving to the next head ID (i.e. refresh the queue state 1105) for the poll or peek operation can be an atomic compare and set operation, where the queue state 1103 is changed only if the current head ID matches the clients head ID. The client process 1104 can then receive a response containing the head ID from the queue state 1103, which has either been incremented by this message, or had previously been incremented.

Finally, the client process 1104 can resend the poll/peek message to the process owning the new head bucket.

Figure 12:
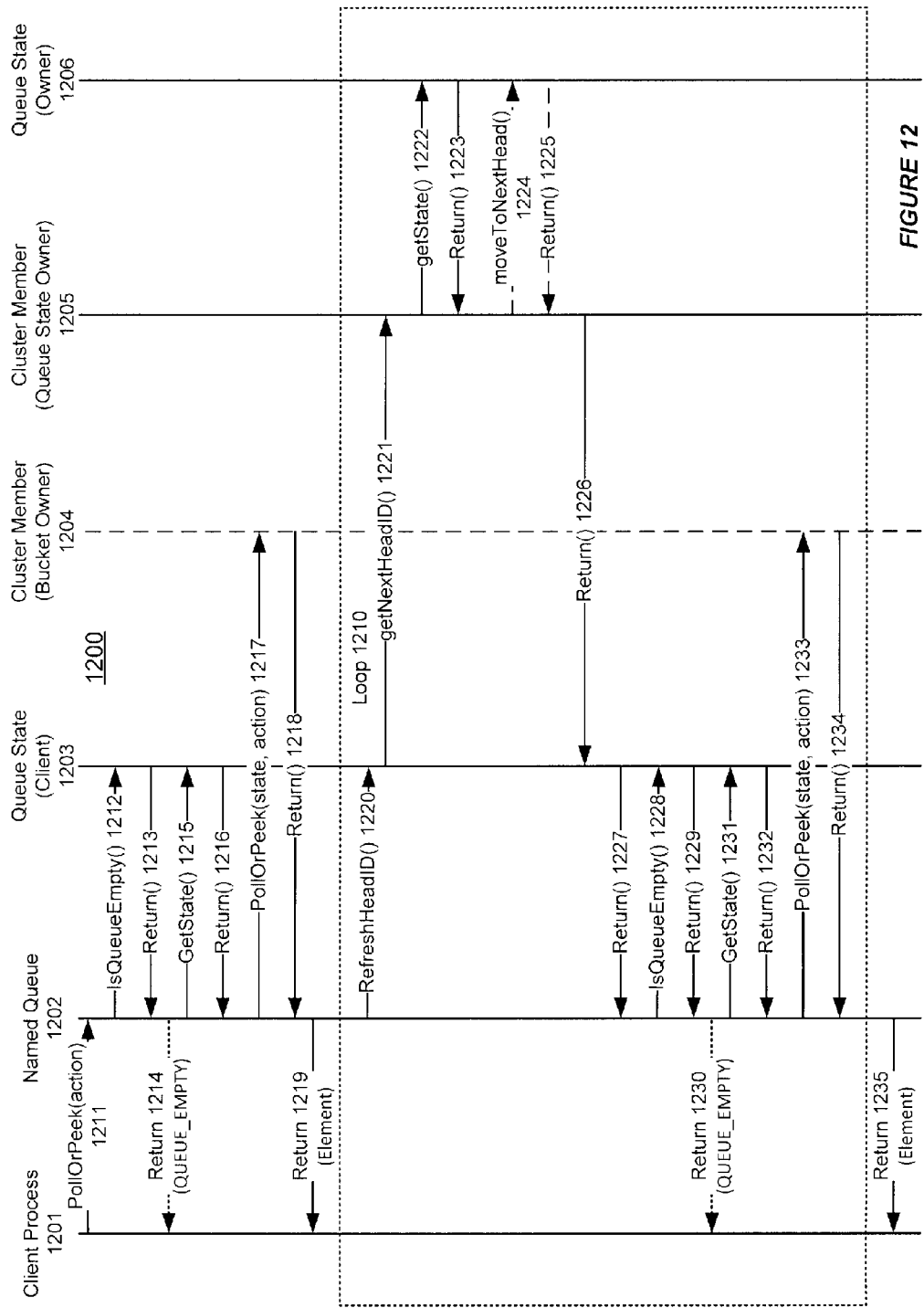
FIG. 12 shows an illustration of an interaction diagram for polling or peeking an element from a distributed queue, in accordance with an embodiment of the invention.

FIG. 12 shows an illustration of an interaction diagram for polling or peeking an element from a distributed queue, in accordance with an embodiment of the invention. As shown in FIG. 12, a client process 1201 can use a named queue 1202 for performing an action, such as a poll or peek action, on one or more elements in a distributed queue 1200 in a distributed data grid. The distributed queue 1200 includes a cluster member 1205, which is the queue state owner 1205 that owns the queue state 1206.

At step 1211, a named queue 1202 can receive a message (e.g. from a client process 1201) to perform a poll or a peek action on the head element of the distributed queue 1200. The named queue 1202, which is associated with the client process 1201, can maintain a local version of the queue state 1203 for the distributed queue 1200.

At steps 1212-1213, the named queue 1202 can check the queue state 1203 to obtain the information on whether the distributed queue 1200 is empty. When the distributed queue 1200 is empty, at step 1214, the named queue 1202 can send a QUEUE_EMPTY message to the client process 1201.

Furthermore, if the queue is not empty, the client process 1201 assumes that it has the current head ID and the queue version number. At steps 1215-1216, the named queue 1202 can request and receive the state information, such as the head ID and the queue version number, from the local queue state 1203. The named queue 1202 can use such information for performing the poll or peek action on the head element of the distributed queue 1200.

Then, at step 1217, the named queue 1202 can perform a poll or a peek action on the cluster member 1204, which owns the head bucket based on the received head ID.

If the action is performed successfully on the head bucket, at step 1218, the cluster member 1204 can return one or more elements to the named queue 1202, and at step 1219, the named queue 1202 can return the elements to the client process 1201.

Otherwise, if the action is not performed successfully on the head bucket, at step 1218, the cluster member 1204 can return an empty set to the named queue 1202. In such a case, the client process 1201 may need to update its view of the head ID and the queue version information.

As shown in FIG. 12, the named queue 1202 may try to perform a poll or peek action on the head of the distributed queue 1200 repeatedly (e.g. in a loop 1210), until either when the distributed queue 1200 is empty or when the action is successfully performed.

Within the loop 1210, at step 1220, the named queue 1202 can request the local queue state 1203 to refresh the head ID and the queue version number, and at step 1221 the local queue state 1203 may try to obtain the next head ID from the cluster member 1205, which is the owner of the queue state 1206.

At steps 1222-1223, the cluster member 1205 can request and obtain the owner version of the state information in the queue state 1206. For example, the message may contain the head ID and the queue version information based on the information in the local queue state 1203. Thus, the cluster member 1205 can determine whether the queue state is stale, e.g. by comparing the information received from the local queue state 1203 and the queue state 1206.

For example, if the information in the local queue state 1203 does not match the information in the queue state 1206, the queue state 1203 is stale. In such a case, the state information in the queue state 1206 may be returned to the queue state 1203 (i.e. the queue state 1203 is refreshed).

When the information in the local queue state 1203 matches the information in the queue state 1206, at step 1224, the cluster member 1205 can update the queue state 1206, e.g. by moving the head to the next bucket ID. Then, at step 1225, the queue state 1206 can provide the updated queue state information to the cluster member 1205. Additionally, a check can be performed to determine whether the queue is empty. For example, the distributed queue 1200 is an empty queue when the head ID is the same as the tail ID, in which case the head ID may not be incremented over the tail ID.

At steps 1226-1227, the cluster member 1205 can provide the queue state information (refreshed or updated) to the queue state 1203, which in turn can provide the queue state information to the named queue 1202. For example, such state information may include either a QUEUE_EMPTY message or an updated head ID with an updated queue version number.

At steps 1228-1229, the named queue 1202 can check the queue state 1203 to determine whether the distributed queue 1200 is empty (since multiple operations may be performed on the distributed queue 1200). At step 1230, when the distributed queue 1200 is empty, the named queue 1202 can send the QUEUE_EMPTY message to the client process 1201.

Otherwise, at steps 1231-1232, the named queue 1202 can request and obtain the updated queue state information from the queue state 1203. At steps 1233-1234, the named queue 1202 can perform a poll or a peek action on the cluster member 1204 (or any other cluster member that owns the bucket with the updated head ID).

As shown in FIG. 12, the named queue 1202 may try to perform the poll or a peek action on the head of the distributed queue 1200 repeatedly (e.g. in a loop 1210), until the action is successfully performed. At step 1235, the named queue 1202 can return the elements to the client process 1201.

Figure 13:
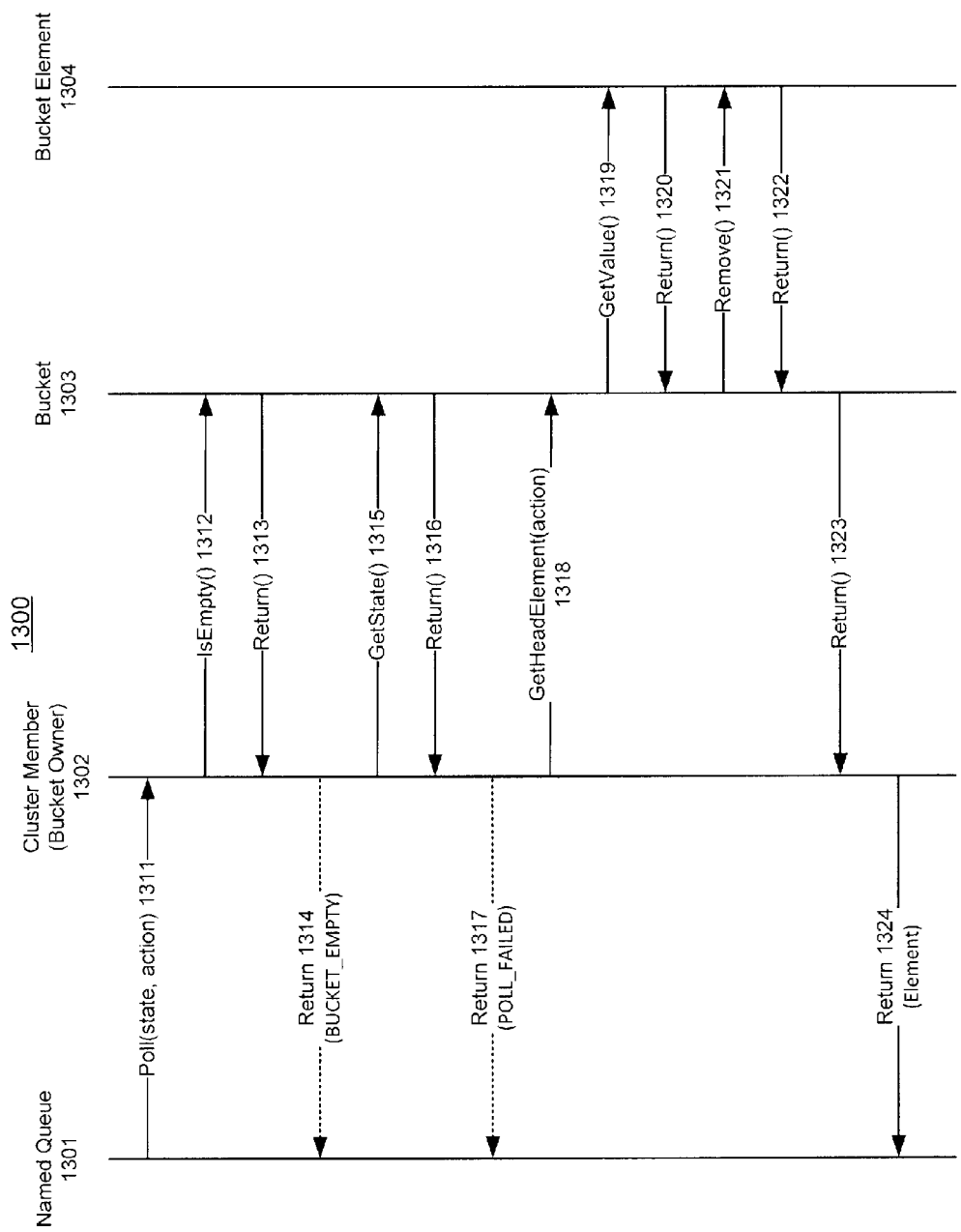
FIG. 13 shows an illustration of an interaction diagram for polling or peeking an element from a bucket in a distributed queue, in accordance with an embodiment of the invention.

FIG. 13 shows an illustration of an interaction diagram for polling or peeking an element from a bucket in a distributed queue, in accordance with an embodiment of the invention. As shown in FIG. 13, a caller (e.g. a named queue 1301) can be used for performing an action, such as a poll or peek operation, on a bucket 1303, which is owned by a cluster member 1302 in a distributed data grid.

At step 1311, the named queue 1301 can perform a poll or peek action on the cluster member 1302 based on the state information, such as the bucket ID and the queue version number.

At steps 1312-1313, the cluster member 1302 can check whether the bucket 1303 is empty. At step 1314, the cluster member 1302 can send a BUCKET_EMPTY message to the named queue 1301, if the bucket 1303 is empty.

At steps 1315-1316, the cluster member 1302 can obtain the bucket state information from the bucket 1003.

At step 1317, if the queue version information in the view of the named queue 1301 does not match the queue version information associated with the bucket 1303, the cluster member 1302 can send a POLL_FAILED message to the named queue 1301.

Otherwise, at steps 1318-1324, the cluster member 1302 can perform a poll or peek action on the bucket 1303. For example, if the action is a poll action, the bucket 1303 can return the value of the bucket element 1304 before removing or deleting the bucket element 1304. Additionally, the bucket can update the queue version if the buck become empty after the bucket element 1304 is removed or deleted. Then, the cluster member 1302 can provide the element to the named queue 1301. On the other hand, if the action is a peek action, the bucket 1303 can return the value of the bucket element 1304 without removing or deleting the bucket element 1304.

Figure 14:
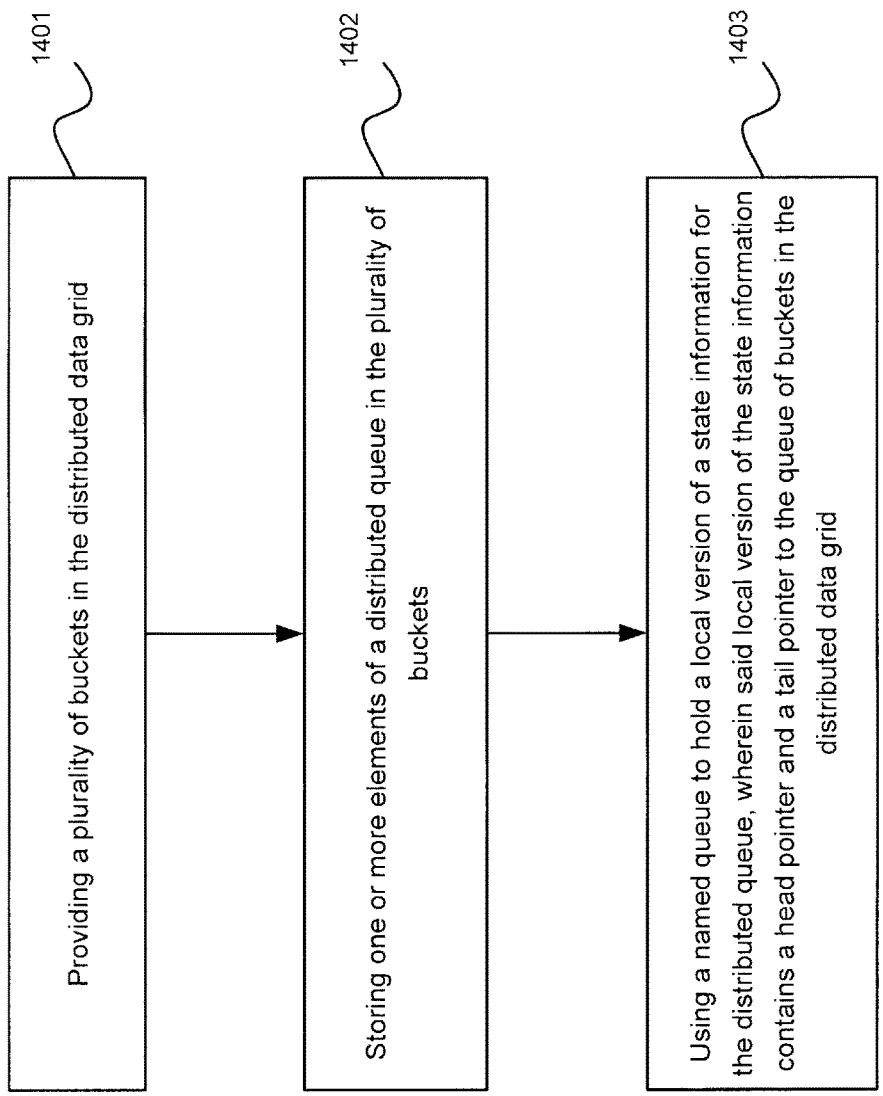
FIG. 14 illustrates an exemplary flow chart for supporting a distributed queue in a distributed data grid, in accordance with an embodiment of the invention.

FIG. 14 illustrates an exemplary flow chart for supporting a distributed queue in a distributed data grid, in accordance with an embodiment of the invention. As shown in FIG. 14, at step 1401, the system can provide a plurality of buckets in the distributed data grid. Then, at step 1402, the system can store one or more elements of a distributed queue in the plurality of buckets. Furthermore, at step 1403, the system can use a named queue to hold a local version of a state information for the distributed queue, wherein said local version of the state information contains a head pointer and a tail pointer to the queue of buckets in the distributed data grid.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. The storage medium or computer readable medium (media) may be non-transitory.

The foregoing description of the present invention has been provided for the purposes of illustration and description. It is not intended to be exhaustive or to limit the invention to the precise forms disclosed. Many modifications and variations will be apparent to the practitioner skilled in the art. The modification and variation include any relevant combination of the described features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting a distributed queue, comprising:
    one or more microprocessors;
    a distributed data grid comprising a plurality of member nodes operating on the one or more microprocessors;
    a plurality of buckets distributed over the plurality of member nodes in the distributed data grid, wherein the plurality of buckets are maintained as a distributed queue, including a current tail bucket that acts as a tail of the distributed queue, and wherein each of the plurality of buckets are configured to store one or more elements of the distributed queue;
    a queue state owner member node of the plurality of member nodes, wherein the queue state owner member node executes a queue state owner process, wherein the queue state owner process holds queue state information for the distributed queue, and wherein the queue state owner process provides the state information about the distributed queue to a client process; and
    wherein said client process is configured to
        store a local version of the queue state information for the distributed queue, and
        use the local version of the queue state information about the distributed queue to perform an operation on one or more elements in a bucket in the distributed queue.

2. The system according to claim 1, wherein:
    said plurality of buckets are evenly distributed across a plurality of processes of said plurality of member nodes in the distributed data grid.

3. The system according to claim 1, wherein:
    multiple operations are simultaneously performed on different buckets associated with the distributed queue.

4. The system according to claim 1, wherein:
    said queue state owner process is configured to update the state information about the distributed queue when the distributed queue changes.

5. The system according to claim 1, wherein:
    a bucket is locked while an operation is performed, wherein other operations on said bucket are configured to wait until the operation is completed.

6. The system according to claim 1, further comprising a tail bucket owner member node of the plurality of member nodes, wherein the tail bucket owner member node owns a set of buckets of the plurality of buckets including the current tail bucket.

7. The system according to claim 1, wherein:
    each bucket maintains a bucket state, wherein the bucket state is used to access one or more elements in said bucket.

8. The system according to claim 1, wherein:
    at least one bucket is associated with a back-up bucket, which contains one or more elements contained in said at least one bucket.

9. The system according to claim 6, wherein:
    the state information for the distributed queue includes which member node is the tail bucket owner member node; and
    wherein said client process is configured to refresh the local version of the queue state information stored in said client process by updating which member node is the tail bucket owner member node based on the queue state information held by the queue state owner process.

10. A method for supporting a distributed queue in a distributed data grid comprising a plurality of member nodes, the method comprising:
    providing a plurality of buckets distributed over the plurality of member nodes in the distributed data grid, wherein the plurality of buckets are maintained as a distributed queue, including a current tail bucket that acts as a tail of the distributed queue, and wherein each of the plurality of buckets are configured to store one or more elements of the distributed queue;
    holding, via a state owner process operating on one of said plurality of nodes, state information about the distributed queue;
    providing, at a queue state owner member node of the plurality of member nodes, a queue state owner process, wherein the queue state owner process holds queue state information for the distributed queue, and wherein the queue state owner process provides the state information about the distributed queue to a client process;
    storing, using said client process, a local version of the queue state information for the distributed queue; and
    performing, using the client process, an operation on one or more elements in a bucket in the distributed queue based on said local version of the queue state information for the distributed queue.

11. The method of claim 10, further comprising:
distributing said plurality of buckets evenly across a plurality of processes operating on said plurality of member nodes in the distributed data grid.

12. The method according to claim 10, further comprising:
performing multiple operations simultaneously on different buckets associated with the distributed queue.

13. The method according to claim 10, further comprising:
updating, by said queue state owner process, the state information for the distributed queue when the distributed queue data structure changes.

14. The method according to claim 10, further comprising:
allowing a bucket to be locked while an operation is performed, wherein other operations on said bucket are configured to wait until the operation is completed.

15. The method according to claim 10, further comprising:
providing a tail bucket owner member node of the plurality of member nodes, wherein the tail bucket owner member node owns a set of buckets of the plurality of buckets including the current tail bucket.

16. The method according to claim 10, further comprising:
allowing each bucket to maintain a bucket state, wherein the bucket state is used to access one or more elements in said bucket.

17. The method according to claim 10, further comprising:
associating at least one bucket with a back-up bucket, which contains one or more elements contained in said at least one bucket.

18. The method according to claim 15, wherein the state information for the distributed queue includes which member node is the tail bucket owner member node; and further comprising:
refreshing the local version of the queue state information stored in said client process by updating which member node is the tail bucket owner member node based on the queue state information held by the queue state owner process.

19. A non-transitory machine readable storage medium having instructions stored thereon for supporting a distributed queue in a distributed data grid comprising a plurality of member nodes, which instructions, when executed by a computer system, cause the computer system to perform steps comprising:
providing a plurality of buckets distributed over the plurality of member nodes in the distributed data grid, wherein the plurality of buckets are maintained as a distributed queue, including a current tail bucket that acts as a tail of the distributed queue, and wherein each of the plurality of buckets are configured to store one or more elements of the distributed queue;
holding, via a state owner process operating on one of said plurality of nodes, state information about the distributed queue;
providing, at a queue state owner member node of the plurality of member nodes, a queue state owner process, wherein the queue state owner process holds queue state information for the distributed queue, and wherein the queue state owner process provides the state information about the distributed queue to a client process;
storing, using said client process, a local version of the queue state information for the distributed queue; and
performing, using the client process, an operation on one or more elements in a bucket in the distributed queue based on said local version of the queue state information for the distributed queue.

* * * * *

UNITED STATES PATENT AND TRADEMARK OFFICE
CERTIFICATE OF CORRECTION

PATENT NO. : 10,250,519 B2  
APPLICATION NO. : 14/676013  
DATED : April 2, 2019  
INVENTOR(S) : Oliver et al.

Page 1 of 1

It is certified that error appears in the above-identified patent and that said Letters Patent is hereby corrected as shown below:

In the Claims

In Column 15, Line 13, in Claim 13, after "queue" delete "data structure".

Signed and Sealed this  
Third Day of November, 2020

Andrei Iancu  
*Director of the United States Patent and Trademark Office*